US009928552B1

(12) United States Patent
Berlin et al.

(10) Patent No.: US 9,928,552 B1
(45) Date of Patent: Mar. 27, 2018

(54) METHODS AND SYSTEMS FOR INSURANCE INVESTMENT PRODUCT DECISION MODELING

(75) Inventors: Scott L. Berlin, Syosset, NY (US); Michael J. Gordon, New York, NY (US); Michelle D. Richter, Stamford, CT (US); Aryeh J. Bak, Modiin (IL)

(73) Assignee: New York Life Insurance Company, New York, NY (US)

( * ) Notice: Subject to any disclaimer, the term of this patent is extended or adjusted under 35 U.S.C. 154(b) by 1080 days.

(21) Appl. No.: 12/403,474

(22) Filed: Mar. 13, 2009

(51) Int. Cl.
*G06Q 40/08* (2012.01)
*G06Q 40/00* (2012.01)

(52) U.S. Cl.
CPC ............. *G06Q 40/08* (2013.01); *G06Q 40/00* (2013.01)

(58) Field of Classification Search
CPC ................................. G06Q 40/08; G06Q 40/00
See application file for complete search history.

(56) References Cited

U.S. PATENT DOCUMENTS

| 5,523,942 | A  | * | 6/1996  | Tyler et al. ................. 705/4 |
| 5,956,691 | A  | * | 9/1999  | Powers .......................... 705/4 |
| 6,014,632 | A  | * | 1/2000  | Gamble et al. ................. 705/4 |
| 6,064,983 | A  | * | 5/2000  | Koehler ........................ 705/31 |
| 6,456,979 | B1 | * | 9/2002  | Flagg ................... G06Q 40/08 705/4 |
| 6,551,777 | B1 | * | 4/2003  | Shuber et al. .................. 435/6 |
| 6,684,189 | B1 | * | 1/2004  | Ryan et al. .................... 705/4 |
| 7,634,420 | B2 | * | 12/2009 | Kendall et al. ................. 705/4 |
| 7,685,007 | B1 | * | 3/2010  | Jacobson ....................... 705/4 |
| 2003/0028466 | A1 | * | 2/2003 | Jenson ................... G06Q 40/00 705/36 R |
| 2004/0078244 | A1 | * | 4/2004 | Katcher ......................... 705/4 |
| 2005/0004856 | A1 | * | 1/2005 | Brose et al. .................. 705/35 |
| 2005/0279035 | A1 | * | 12/2005 | Donovan ....................... 52/79.1 |
| 2007/0005404 | A1 | * | 1/2007 | Raz et al. ...................... 705/4 |
| 2009/0048961 | A1 | * | 2/2009 | Mott ........................... 705/37 |
| 2010/0131300 | A1 | * | 5/2010 | Collopy et al. ................. 705/4 |

OTHER PUBLICATIONS

Samuel H. Cox and Yijia Lin, Natural Hedging of Life and Annuity Mortality Risks, Georgia State University, web, , Jul. 29, 2004, 1-25 (Year: 2004).*

* cited by examiner

*Primary Examiner* — I Jung Liu
(74) *Attorney, Agent, or Firm* — Antonio Papapgeorgiou Meister Seelig & Fein LLP

(57) ABSTRACT

Methods and systems for insurance investment product decision modeling are disclosed. The methods and systems provide means for determining an objectively appropriate insurance investment product or funding level for a customer including inputting a set of customer data including at least certain customer criteria such as age, gender and policy face amount, selecting insurance products for comparison, calculating an expected investment in each of the selected insurance products or funding levels, calculating an expected benefit from each of the selected insurance products or funding levels using at least an economic model, calculating a value for each of the types of insurance based on the expected investment and respective expected benefits and recommending an insurance product or funding level based at least in part on a comparison of the value or net gain for the selected insurance products or funding levels being compared.

17 Claims, 16 Drawing Sheets

| a. Issue Age (25,35,45,55) | 25 | 35 | 45 | 55 | 25 | 35 |
|---|---|---|---|---|---|---|
| b. Sex (M,F) | Male | Male | Male | Male | Female | Female |
| c. Risk Class: SP | SP | SP | SP | SP | SP | SP |
| d. Face ($.1/.25/.5/1M) | $100,000 | $100,000 | $100,000 | $100,000 | $100,000 | $100,000 |
| e. Inv. Risk= %Eq/FI (1~5) | 1 | 1 | 1 | 1 | 1 | 1 |

| | 25 | 35 | 45 | 55 | 25 | 35 |
|---|---|---|---|---|---|---|
| VULPremium | 1,235.67 | 1,715.07 | 2,527.82 | 6,093.00 | 1,071.50 | 1,456.04 |
| CWL Premium | 1,127.00 | 1,684.00 | 2,877.00 | 6,093.00 | 1,010.00 | 1,472.00 |
| Term Premium | 120.00 | 124.00 | 213.00 | 459.00 | 104.00 | 118.00 |
| Recommendation | | | | | | |
| 2% | VUL | VUL | CWL | CWL | VUL | VUL |
| 10% | VUL | CWL | CWL | CWL | VUL | CWL |
| 20% | VUL | VUL | CWL | CWL | VUL | CWL |
| 50% | VUL | VUL | CWL | CWL | VUL | CWL |
| 100% | VUL | VUL | CWL | CWL | VUL | CWL |

| Choice #2 [Suitability] | | | | | | |
|---|---|---|---|---|---|---|
| 2% | BTID | BTID | VUL | VUL | BTID | BTID |
| 10% | BTID | VUL | BTID | BTID | BTID | VUL |
| 20% | BTID | BTID | VUL | VUL | BTID | VUL |
| 50% | BTID | BTID | VUL | VUL | BTID | VUL |
| 100% | BTID | BTID | VUL | VUL | BTID | VUL |

FIG. 5B

| NetGain VUL | | | | | |
|---|---|---|---|---|---|
| 1 | 9,409.21 | 17,172.72 | 7,229.50 | 4,945.02 | 18,238.10 | 14,720.75 |
| 2 | 12,483.00 | 15,402.58 | 8,585.23 | (2,128.12) | 11,196.05 | 13,341.63 |
| 3 | 20,026.44 | 12,134.52 | 6,630.85 | (4,006.74) | 17,850.58 | 10,432.53 |
| 4 | 62,903.12 | 51,640.77 | 33,468.68 | 21,182.02 | 55,836.19 | 44,265.38 |
| 5 | 10,507.39 | 4,954.05 | (6,431.50) | (10,708.48) | 9,655.08 | 4,549.53 |
| 6 | 4,251.02 | 132.68 | (2,334.13) | (1,059.93) | 3,985.28 | 213.24 |
| 490 | 13,383.30 | 15,645.12 | 17,543.84 | 6,157.66 | 11,966.84 | 13,623.88 |
| 491 | 2,970.12 | 6,258.33 | 7,204.32 | (1,247.77) | 2,843.90 | 5,580.94 |
| 492 | 52,995.73 | 31,217.44 | 11,439.66 | (9,451.81) | 47,022.15 | 26,778.06 |
| 493 | 1,753.08 | (1,025.99) | (6,687.02) | (14,123.38) | 1,814.57 | (640.10) |
| 494 | 8,203.67 | 9,154.99 | 3,753.38 | (1,435.05) | 7,548.26 | 8,013.95 |
| 495 | 11,537.88 | 8,500.48 | 5,248.55 | (1,566.40) | 10,424.72 | 7,437.39 |
| 496 | 33,652.40 | 28,701.09 | 21,042.05 | 20,810.30 | 29,809.95 | 24,590.49 |
| 497 | (7,197.56) | (10,898.33) | (12,837.93) | (8,233.88) | (5,814.25) | (7,102.31) |
| 498 | (11,517.68) | (10,132.61) | (10,593.05) | (16,125.53) | (8,362.80) | (7,858.60) |
| 499 | 9,156.85 | (451.03) | (9,974.49) | (16,538.99) | 8,373.87 | 7.26 |
| 500 | 2,961.97 | (1,506.19) | (7,767.66) | (15,759.45) | 2,902.68 | (913.25) |
| NetGain BTID (VUL) | | | | | |
| 1 | 1,537.46 | 9,567.34 | 9,141.09 | 6,042.75 | 10,005.96 | 8,521.10 |
| 2 | 5,598.60 | 7,980.06 | 9,395.55 | 166.20 | 5,130.99 | 7,152.75 |
| 3 | 13,454.00 | 8,355.64 | 9,851.70 | 768.47 | 12,020.04 | 7,479.50 |
| 4 | 30,248.79 | 27,691.51 | 28,184.15 | 22,389.56 | 26,025.26 | 23,448.68 |
| 5 | 6,264.01 | 4,578.72 | 3,868.17 | (2,107.93) | 5,760.67 | 4,395.01 |
| 6 | 2,865.65 | 347.21 | 2,235.94 | 3,153.63 | 2,836.28 | 734.08 |
| 7 | 171.90 | 3,088.05 | 6,388.29 | 4,171.65 | 433.15 | 3,012.44 |
| 8 | 5,143.38 | 8,192.48 | 14,701.11 | 12,623.13 | 4,752.17 | 7,261.33 |
| 9 | 1,885.59 | 2,348.82 | 6,443.25 | 396.70 | 1,951.92 | 2,388.85 |
| 10 | 16,833.31 | 18,033.61 | 17,817.15 | 5,466.90 | 14,616.39 | 15,453.17 |

FIG. 5C

| 45 Female SP $100,000 1 | 55 Female SP $100,000 1 | 25 Male SP $100,000 2 | 35 Male SP $100,000 2 | 45 Male SP $100,000 2 | 55 Male SP $100,000 2 | 25 Female SP $100,000 2 | 35 Female SP $100,000 2 |
|---|---|---|---|---|---|---|---|
| 2,075.93 | 5,321.00 | 1,235.67 | 1,715.07 | 2,527.82 | 6,093.00 | 1,071.50 | 1,456.04 |
| 2,497.00 | 5,321.00 | 1,127.00 | 1,684.00 | 2,877.00 | 6,093.00 | 1,010.00 | 1,472.00 |
| 184.00 | 321.00 | 120.00 | 124.00 | 213.00 | 459.00 | 104.00 | 118.00 |
| CWL | CWL | VUL | VUL | CWL | CWL | VUL | VUL |
| CWL | CWL | VUL | VUL | CWL | CWL | VUL | VUL |
| CWL | CWL | VUL | VUL | CWL | CWL | VUL | VUL |
| CWL | CWL | VUL | VUL | CWL | CWL | VUL | VUL |
| CWL | CWL | VUL | VUL | CWL | CWL | VUL | VUL |
| VUL | VUL | BTID | BTID | BTID | BTID | BTID | BTID |
| VUL | VUL | BTID | BTID | BTID | BTID | BTID | BTID |
| VUL | VUL | BTID | BTID | BTID | BTID | BTID | BTID |
| VUL | VUL | BTID | BTID | BTID | BTID | BTID | BTID |
| VUL | VUL | BTID | BTID | BTID | BTID | BTID | BTID |

FIG. 5D

| | | | | | |
|---|---|---|---|---|---|
| 5,974.64 | 7,155.95 | 13,887.05 | 12,842.29 | 2,171.69 | (2,139.85) | 12,599.90 | 11,160.67 |
| 7,246.07 | 194.42 | (1,079.54) | 3,352.40 | (103.70) | (11,198.86) | (675.62) | 3,145.41 |
| 5,508.44 | (1,450.54) | 15,964.93 | 8,032.08 | 3,380.62 | (10,983.36) | 14,485.35 | 7,063.93 |
| 27,546.54 | 22,160.24 | 68,717.74 | 58,782.95 | 38,643.91 | 23,298.21 | 61,016.04 | 50,608.44 |
| (1,633.02) | (5,151.95) | 2,248.77 | 304.12 | (10,992.48) | (16,462.35) | 2,350.37 | 547.68 |
| (312.36) | 1,739.95 | 1,179.24 | (2,944.05) | (3,590.36) | 1,998.57 | 1,283.22 | (2,472.32) |
| 14,490.95 | 8,172.90 | 3,356.65 | 8,094.60 | 14,603.69 | 866.18 | 3,207.31 | 7,261.76 |
| 6,178.49 | 1,040.48 | (4,426.44) | (740.76) | 3,853.52 | (2,917.81) | (3,677.72) | (441.00) |
| 9,539.98 | (4,298.25) | 68,855.02 | 41,466.56 | 14,348.39 | (13,700.81) | 61,226.69 | 35,703.77 |
| (2,225.03) | (8,134.31) | (4,434.20) | (6,752.16) | (11,629.13) | (20,901.02) | (3,613.10) | (5,484.68) |
| 3,332.47 | 1,125.54 | 10,371.60 | 9,981.62 | 1,741.25 | (2,748.88) | 9,476.53 | 8,836.32 |
| 4,489.20 | 1,049.43 | 9,171.59 | 5,375.90 | (706.15) | (9,420.25) | 8,421.60 | 4,804.89 |
| 17,215.95 | 21,829.48 | 20,329.07 | 17,911.85 | 10,954.82 | 12,938.35 | 18,041.68 | 15,399.18 |
| (6,847.53) | (4,154.00) | (12,027.43) | (16,190.80) | (19,525.77) | (15,483.88) | (9,634.43) | (11,729.23) |
| (6,015.69) | (9,736.88) | (16,144.15) | (17,200.72) | (16,652.72) | (24,744.22) | (12,283.12) | (13,209.92) |
| (3,896.80) | (9,035.04) | 1,297.87 | (6,933.91) | (15,153.53) | (24,117.55) | 1,511.89 | (5,474.85) |
| (2,866.13) | (9,184.90) | (2,263.91) | (5,099.60) | (11,655.52) | (21,455.42) | (1,669.65) | (4,025.03) |
| 7,964.99 | 6,674.80 | 7,973.38 | 7,290.06 | 5,410.75 | 85.29 | 7,197.56 | 6,506.89 |
| 8,058.36 | 1,597.00 | (2,388.23) | 812.56 | 2,510.58 | (7,607.02) | (1,801.36) | 1,024.52 |
| 8,545.96 | 2,136.57 | 11,523.81 | 6,288.43 | 7,315.62 | (4,948.60) | 10,351.18 | 5,598.42 |
| 23,226.10 | 20,910.20 | 35,995.87 | 34,801.64 | 33,079.71 | 25,813.16 | 30,938.82 | 29,154.57 |
| 4,031.76 | (495.68) | 724.75 | 1,063.42 | (1,282.89) | (7,941.32) | 931.67 | 1,322.07 |
| 2,470.00 | 4,261.31 | 467.13 | (2,173.35) | (216.19) | 5,043.92 | 694.18 | (1,518.85) |
| 5,559.49 | 5,036.41 | (7,111.95) | (4,478.89) | (243.75) | (2,363.94) | (5,912.62) | (3,475.90) |
| 12,343.35 | 12,505.99 | (2,632.12) | 3,754.85 | 14,579.27 | 15,913.02 | (2,014.82) | 3,454.83 |
| 5,633.88 | 1,781.30 | (1,955.04) | (411.58) | 5,778.63 | (50.89) | (1,466.06) | (61.29) |
| 14,849.36 | 6,283.05 | 14,814.06 | 16,268.84 | 14,741.76 | (1,119.99) | 12,925.35 | 13,920.90 |

| | A | B | C | G | H | I | Q | U | Y |
|---|---|---|---|---|---|---|---|---|---|
| 1 | | | VUL | | | | | | $2,968,081 |
| 2 | | | | | | | | | |
| 3 | | | | | | | | | |
| 4 | | Age | VUL Premium | Mortality weighted premium | Death Benefit | Income derived from policy | Mortality Weighted Income derived from policy | Mortality weighted death benefit | Mortality weighted death benefit plus Income derived from policy |
| 5 | 1 | 55 | 299,750 | 299,750 | 5,000,000 | | | 2,535 | 2,535 |
| 6 | 2 | 56 | 299,750 | 299,598 | 5,000,000 | | | 4,591 | 4,591 |
| 7 | 3 | 57 | 299,750 | 299,323 | 5,000,000 | | | 5,863 | 5,863 |
| 8 | 4 | 58 | 299,750 | 298,971 | 5,000,000 | | | 7,343 | 7,343 |
| 9 | 5 | 59 | 299,750 | 298,531 | 5,000,000 | | | 9,065 | 9,065 |
| 10 | 6 | 60 | 299,750 | 297,988 | 5,000,000 | | | 10,919 | 10,919 |
| 11 | 7 | 61 | 299,750 | 297,333 | 5,825,548 | | | 15,073 | 15,073 |
| 12 | 8 | 62 | 299,750 | 295,557 | 6,531,656 | | | 19,655 | 19,655 |
| 13 | 9 | 63 | 299,750 | 295,655 | 6,690,373 | | | 22,976 | 22,976 |
| 14 | 10 | 64 | 299,750 | 294,626 | 6,877,287 | | | 26,656 | 26,656 |
| 15 | 11 | 65 | | | 6,845,224 | 47,692 | 46,692 | 29,282 | 75,973 |
| 16 | 12 | 66 | | | 6,400,019 | 47,692 | 46,488 | 30,314 | 76,802 |
| 17 | 13 | 67 | | | 6,889,576 | 47,692 | 46,252 | 36,223 | 82,484 |
| 18 | 14 | 68 | | | 6,509,446 | 47,692 | 46,011 | 38,141 | 84,152 |
| 19 | 15 | 69 | | | 6,837,452 | 47,692 | 45,732 | 44,567 | 90,299 |
| 20 | 16 | 70 | | | 6,540,457 | 47,692 | 45,421 | 47,781 | 93,202 |
| 21 | 17 | 71 | | | 6,577,480 | 47,692 | 45,072 | 54,127 | 99,199 |
| 22 | 18 | 72 | | | 6,832,082 | 47,692 | 44,680 | 63,867 | 108,547 |
| 23 | 19 | 73 | | | 6,588,587 | 47,692 | 44,234 | 72,715 | 116,949 |
| 24 | 20 | 74 | | | 5,840,653 | 47,692 | 43,731 | 68,802 | 112,534 |
| 25 | 21 | 75 | | | 6,596,195 | 47,692 | 43,170 | 73,456 | 116,625 |
| 26 | 22 | 76 | | | 6,031,237 | 47,692 | 42,544 | 88,064 | 130,508 |
| 27 | 23 | 77 | | | 6,434,698 | 47,692 | 41,847 | 104,364 | 146,211 |
| 28 | 24 | 78 | | | 6,779,459 | 47,692 | 41,074 | 121,810 | 162,884 |
| 29 | 25 | 79 | | | 8,344,791 | 47,692 | 40,217 | 166,442 | 206,659 |

Fig. 6

| | 1 | 2 | 3 | 4 | 5 | 6 | 7 | 8 | 9 |
|---|---|---|---|---|---|---|---|---|---|
| | 25 | 35 | 45 | 55 | 25 | 35 | 45 | 55 | 25 |
| | | | | | 0.220672234 | 0.00354361 | 0.072951509 | -0.074073012 | |
| | | | | | 0.368135578 | 0.237175762 | 0.223295088 | 0.122779696 | |
| | | | | | 0.548421078 | 0.483902006 | 0.422150296 | 0.288574539 | |
| | | | | | 1.108910031 | 1.028967212 | 0.830333587 | 0.766256797 | |
| a. Issue Age (25,35,45,55) | 25 | 35 | 45 | 55 | 25 | 35 | 45 | 55 | 25 |
| b. Sex (M,F) | Male | Male | Male | Female | Female | Female | Female | Female | Male |
| c. Risk Class: NS | NS | NS | NS | NS | NS | NS | NS | NS | NS |
| d. Face ($1/25/$/1M) | $100,000 | $100,000 | $100,000 | $100,000 | $100,000 | $100,000 | $100,000 | $100,000 | $100,000 |
| e. Inv. Risk=%Eq/FI (1-5) | 1 | 1 | 1 | 1 | 1 | 1 | 1 | 1 | 2 |
| Tax Bracket | 28% | | | | | | | | |
| CWL Exp Return | 37,798 | 32,209 | 24,107 | 18,692 | 33,982 | 28,405 | 20,712 | 18,045 | 20,470 |
| VUL Exp Return | 13,897 | 10,315 | 3,924 | (2,089) | 13,379 | 9,791 | 4,885 | 6,080 | 9,158 |
| BTID | 4,577 | (3,334) | 5,574 | 3,950 | 3,772 | (2,422) | 4,446 | 4,220 | 4,140 |
| Invest Only Exp Return | 10,773 | 10,236 | 8,926 | 9,124 | 9,204 | 8,649 | 7,367 | 8,033 | 8,721 |
| CWL STDEV | 16,367 | 13,330 | 9,186 | 6,475 | 14,892 | 11,872 | 7,960 | 6,233 | 11,034 |
| VUL STDEV | 13,243 | 12,348 | 10,822 | 10,748 | 12,089 | 10,735 | 8,292 | 9,514 | 15,597 |
| BTID STDEV | 10,650 | 10,335 | 9,430 | 9,914 | 9,808 | 9,221 | 8,082 | 9,288 | 12,604 |
| Invest Only STDEV | 12,185 | 11,474 | 10,551 | 11,293 | 11,008 | 10,095 | 8,980 | 10,293 | 14,991 |
| Excess Gain/St Dev CWL | 2.3 | 2.4 | 2.6 | 2.9 | 2.3 | 2.4 | 2.6 | 2.9 | 1.9 |
| Excess Gain/St Dev VUL | 1.0 | 0.8 | 0.4 | (0.2) | 1.1 | 0.9 | 0.6 | 0.6 | 0.6 |
| Excess Gain/St Dev BTID | 0.4 | (0.3) | 0.6 | 0.4 | 0.4 | (0.3) | 0.6 | 0.5 | 0.3 |
| Excess Gain/St Dev Invest Only | 0.9 | 0.9 | 0.8 | 0.8 | 0.8 | 0.9 | 0.8 | 0.8 | 0.6 |
| Recommendation | CWL | CWL | CWL | CWL | CWL | CWL | CWL | CWL | CWL |
| VUL wins | 32 | 16% | | | | | | | |
| CWL wins | 141 | 71% | | | | | | | |
| BTID wins | 0 | 0% | | | | | | | |
| IO wins | 27 | 14% | | | | | | | |
| CWL 95% | 17,998.85 | 14,955.08 | 11,605.71 | 9,179.26 | 15,779.68 | 13,334.52 | 9,923.35 | 9,025.41 | 7,086.93 |
| CWL 90% | 20,067.47 | 17,699.80 | 13,478.11 | 11,067.52 | 18,501.18 | 15,714.16 | 11,386.50 | 10,572.39 | 8,915.84 |
| CWL 75% | 26,636.02 | 22,947.55 | 17,567.68 | 14,201.22 | 24,009.41 | 20,239.29 | 15,014.23 | 13,556.32 | 12,945.67 |
| CWL 50% | 35,092.49 | 30,324.12 | 23,202.49 | 17,923.54 | 31,666.60 | 25,859.31 | 19,962.93 | 17,430.97 | 18,774.59 |
| VUL 95% | (3,481.18) | (6,524.59) | (10,295.35) | (18,840.13) | (2,573.58) | (4,367.79) | (5,741.12) | (6,182.76) | (8,740.23) |
| VUL 90% | (645.71) | (3,673.86) | (8,344.45) | (14,179.53) | 162.04 | (2,518.38) | (4,050.21) | (3,630.69) | (6,554.10) |
| VUL 75% | 4,742.52 | 1,707.36 | (4,047.65) | (8,848.74) | 4,931.04 | 2,280.60 | (851.60) | (312.67) | (1,150.77) |
| VUL 50% | 11,415.93 | 8,592.04 | 1,960.24 | (2,883.86) | 11,172.32 | 8,095.50 | 2,285.79 | 3,912.34 | 5,537.81 |

| a. Issue Age (25,35,45,55) | 1 | 2 | 3 | 4 |
|---|---|---|---|---|
| | 25 | 35 | 45 | 55 |
| b. Sex (M,F) | Male | Male | Male | Male |
| c. Risk Class: NS | NS | NS | NS | NS |
| d. Face ($.1/.25/.5/1M) | $100,000 | $100,000 | $100,000 | $100,000 |
| e. Inv. Risk= %Eq/FI (1~5) | 1 | 1 | 1 | 1 |

| | | | | |
|---|---|---|---|---|
| Tax Bracket | 28% | | | |
| CWL Exp Return | 37,798 | 32,209 | 24,107 | 18,692 |
| 720 VUL Exp Return | 13,897 | 10,315 | 3,924 | (2,089) |
| BTID Exp Return | 4,577 | (3,334) | 5,574 | 3,950 |
| Invest Only Exp Return | 10,773 | 10,236 | 8,926 | 9,124 |
| CWL STDEV | 16,367 | 13,330 | 9,186 | 6,475 |
| 730 VUL STDEV | 13,243 | 12,348 | 10,822 | 10,748 |
| BTID STDEV | 10,650 | 10,335 | 9,430 | 9,914 |

FIG. 7B

|  |  |  |  |  |
|---|---|---|---|---|
| Invest Only STDEV | 12,185 | 11,474 | 10,551 | 11,293 |
| Excess Gain/ St. Dev CWL | 2.3 | 2.4 | 2.6 | 2.9 |
| 740 Excess Gain/ St. Dev VUL | 1.0 | 0.8 | 0.4 | (0.2) |
| Excess Gain/ St. Dev. BTID | 0.4 | (0.3) | 0.6 | 0.4 |
| Excess Gain/ St. Dev. Invest Only | 0.9 | 0.9 | 0.8 | 0.8 |
| 750 Recommendation | CWL | CWL | CWL | CWL |
| VUL wins | 32 | 16% | | |
| CWL wins | 141 | 71% | | |
| BTID wins | 0 | 0% | | |
| IO Wins | 27 | 14% | | |
| CWL 95% | 17,998.85 | 14,965.08 | 11,605.71 | 9,179.26 |
| CWL 90% | 20,607.47 | 17,699.80 | 13,478.11 | 11,076.52 |
| CWL 75% | 26,636.02 | 22,947.55 | 17,567.68 | 14,201.22 |
| CWL 50% | 35,092.49 | 30,324.12 | 23,202.49 | 17,923.54 |
| VUL 95% | (3,481.18) | (6,524.59) | (10,295.35) | (18,840.13) |
| VUL 90% | (645.71) | (3,673.86) | (8,344.45) | (14,179.53) |
| VUL 75% | 4,742.52 | 1,707.36 | (4,047.65) | (8,848.74) |
| VUL 50% | 11,445.93 | 8,592.04 | 1,960.24 | (2,883.86) |

FIG. 7C

| 5 | 6 | 7 | 8 | 9 |
|---|---|---|---|---|
| 25 | 35 | 45 | 55 | 25 |
| Female | Female | Female | Female | Male |
| NS | NS | NS | NS | NS |
| $100,000 | $100,000 | $100,000 | $100,000 | $100,000 |
| 1 | 1 | 1 | 1 | 2 |
| 33,982 | 28,405 | 20,712 | 18,045 | 20,470 |
| 13,379 | 9,791 | 4,885 | 6,080 | 9,158 |
| 3,772 | (2,422) | 4,446 | 4,220 | 4,140 |
| 9,204 | 8,649 | 7,367 | 8,033 | 8,721 |
| 14,892 | 11,872 | 7,960 | 6,233 | 11,034 |
| 12,089 | 10,735 | 8,292 | 9,514 | 15,597 |
| 9,808 | 9,221 | 8,082 | 9,288 | 12,604 |

FIG. 7D

| | | | |
|---|---|---|---|
| 11,008 | 10,095 | 8,980 | 10,293 | 14,991 |
| 2.3 | 2.4 | 2.6 | 2.9 | 1.9 |
| 1.1 | 0.9 | 0.6 | 0.6 | 0.6 |
| 0.4 | (0.3) | 0.6 | 0.5 | 0.3 |
| 0.8 | 0.9 | 0.8 | 0.8 | 0.6 |
| CWL | CWL | CWL | CWL | CWL |
| | | | | |
| 15,779.68 | 13,334.52 | 9,923.35 | 9,025.41 | 7,086.93 |
| 18,501.18 | 15,714.16 | 11,386.50 | 10,572.39 | 8,915.84 |
| 24,009.41 | 20,239.29 | 15,014.23 | 13,556.32 | 12,945.67 |
| 31,666.60 | 26,859.31 | 19,962.93 | 17,430.97 | 18,774.59 |
| (2,573.58) | (4,367.79) | (5,741.12) | (6,182.76) | (8,740.23) |
| 162.04 | (2,518.38) | (4,050.21) | (3,630.69) | (6,564.10) |
| 4,931.04 | 2,280.60 | (851.60) | (312.67) | (1,150.77) |
| 11,172.32 | 8,095.50 | 2,285.79 | 3,912.34 | 5,537.81 |

FIG. 7E

| 25 | 35 | 45 | 55 |
|---|---|---|---|
| 0.220677234 | 0.00354361 | 0.072951509 | -0.074073012 |
| 0.368135578 | 0.237175762 | 0.223295088 | 0.122779696 |
| 0.548421078 | 0.483902006 | 0.422150296 | 0.288574539 |
| 1.108910031 | 1.028967212 | 0.830333587 | 0.766256797 |

760

US 9,928,552 B1

METHODS AND SYSTEMS FOR INSURANCE INVESTMENT PRODUCT DECISION MODELING

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

This invention relates to the field of insurance investments and investment management and more particularly, to methods and systems for modeling and selection of insurance investment products.

BACKGROUND OF THE INVENTION

Insurance products have been recognized as desirable for investment purposes and in some cases being included within a person's overall investment portfolio. However, selection of appropriate insurance products for investment or otherwise can be complex and particularly difficult for individual customers or prospective insureds. Because of this, individuals often consult with professionals such as insurance agents for assistance in selecting an appropriate policy. In such cases, insurance agents often base their determinations for insurance policy selection on a relatively small set of factors such as the prospective insured's risk tolerance, available cash flow and time horizon. However, this process still involves a fair amount of subjectivity and sometimes leads to the selection of insurance products which are not the best possible choice for a given individual. It is also not feasible for individuals or insurance agents to make complete market or economic scenario assessments for individual customers. There is therefore a need for a mechanism to determine an appropriate insurance investment product for an individual or group of individuals which is objectively based. There is also a need for a mechanism that can account for a broad set of economic scenarios and provide objective comparisons of potential insurance products to facilitate selection.

SUMMARY OF THE INVENTION

The present invention overcomes the above-noted and other shortcomings of the prior art by providing a novel and improved method for determining an objectively appropriate insurance investment product for a customer. In some embodiments, the method includes inputting a set of customer data including at least certain customer criteria such as age, gender and policy face amount, selecting at least two insurance products, calculating an expected investment in each of the selected insurance products, calculating an expected benefit from a first and second insurance products using at least an economic model, calculating a value for each of a first and a second type of insurance based on the expected investment and respective expected benefits, and recommending an insurance product, the recommendation generated based at least in part on a comparison of the value or net gain for the selected insurance products. In some embodiments, the at least two insurance products being evaluated are each variations of a single type of insurance product, but with variations in the level of funding, investment sleeves, or features such as riders. Other variations of insurance products are contemplated as within the scope of the invention.

In some embodiments, more than one set of customer data is input or invoked and/or selecting insurance products including a variable universal life insurance product or a term life insurance product or other types of insurance products. In further embodiments, the set of customer data includes one or more risk classifications, which may concern underwriting risk or investor risk aversion, and the selection of insurance product types is based at least in part on such assigned customer risk classification.

In some embodiments, calculating an expected investment in the selected insurance product includes calculating the present value of expected premiums to be paid based at least in part on a mortality assumption corresponding to the set of customer data. In other embodiments, calculating an expected investment in the selected insurance product involves calculating expected premiums to be paid based at least in part on characteristics of the selected insurance product.

In some embodiments, calculating an expected benefit from a first type of insurance product or a second type of insurance product comprises calculating an expected benefit based at least in part on mortality-weighted death benefits and mortality weighted distributions from the contract for retirement income or other purposes, or mortality weighted withdrawals from and loans on the life insurance contract. In still further embodiments, calculating an expected benefit from a first type of insurance product or a second type of insurance product comprises calculating an expected benefit based at least in part on a market return scenario or other modeling technique, such as a stochastic economic scenario generator, to simulate multiple different return scenarios for each given set of customer data.

In some embodiments of the present invention, a recommendation is generated for insurance based at least in part on comparing the results of the economic scenario generator for each set of customer data.

BRIEF DESCRIPTION OF THE DRAWINGS

The invention is illustrated in the figures of the accompanying drawings which are meant to be exemplary and not limiting, in which like references are intended to refer to like or corresponding parts throughout, and in which:

FIG. 5 illustrates a table of calculations of expected benefit and net gains, in accordance with another embodiment of the present invention.

FIGS. 5A-5D comprise FIG. 5, shown in enlarged form, with FIG. 5A comprising the top left portion of FIG. 5, FIG. 5B comprising the bottom left portion of FIG. 5, FIG. 5C comprising the top right portion of FIG. 5 and FIG. 5D comprising the bottom right portion of FIG. 5.

FIG. 6 illustrates how one net gain result is calculated for a specific insurance product in some embodiments.

FIG. 7 illustrates a method for providing insurance investment product recommendations in accordance with another embodiment of the invention.

FIGS. 7A-7E comprise FIG. 7, shown in enlarged form, with FIG. 7A comprising the top left portion of FIG. 7, FIG. 7B comprising the bottom left portion of FIG. 7, FIG. 7C comprising the top right portion of FIG. 7 (excluding reference numeral 760), FIG. 7D comprising the bottom right portion of FIG. 7, and FIG. 7E comprising reference numeral 760 of FIG. 7.

DETAILED DESCRIPTION OF THE PREFERRED EMBODIMENTS

The methods and systems according to the present invention may be applied to any type of insurance or annuity product with investment potential, such as a variable universal life policy, term life insurance plus investment, single premium immediate annuities, etc. and may also be used to compare portfolios that include insurance products against portfolios that do not include insurance products. They may also be used to compare a single product with itself assuming different funding levels, investment sleeves, and/or riders on the product. Therefore, although the methods and systems herein will be discussed by way of example in relation to certain types of insurance, it is understood that the present invention is not limited thereto.

Figure 1:
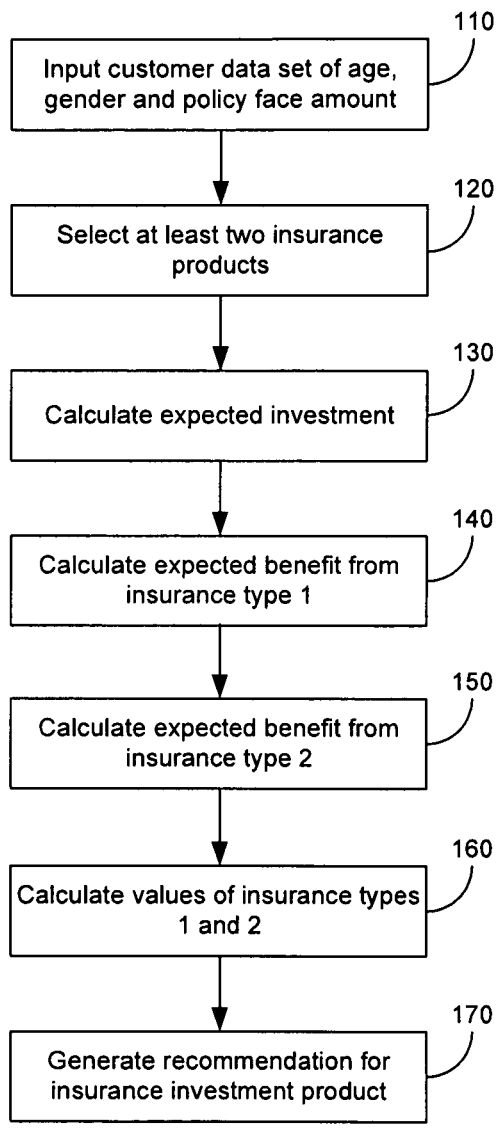
FIG. 1 illustrates a process of generating a recommendation for an insurance product, in accordance with one embodiment of the present invention.

Referring to FIG. 1, a process 100 for generating an objectively based recommendation or proposal for an appropriate insurance investment product is described. Process 100 may be used, for example, with a proposal generation system such as the system 400 embodiment described herein. In some embodiments, process 100 is performed as part of an investment management service or managed account offering wherein the selection of an appropriate insurance investment product is part of a broader set of investment offerings such as equities, mutual funds and fixed income products and management services, in some cases for an asset based fee. For instance, an investment adviser representative may meet with a prospective customer and work with the customer to identify the customer's goals and objectives. In some embodiments, the representative works with the customer to complete an investment risk tolerance questionnaire to facilitate the development of a specific asset allocation plan. In other embodiments, the process is performed by an insurance or investment consumer directly, using software programmed to perform the steps of the process available, for example, through a website accessed over a network such as the Internet. In still further embodiments, the process may be performed by an employee of an issuer or investment management company in connection with providing recommendations to customers for insurance investment options. In still further embodiments, the process may be performed by an entity which provides recommendations to third party institutions, government entities, insurance issuers and the like, such as on fee for recommendation or monthly service charge basis. Process 100 may be used, for example, by a customer, investor, issuer, on behalf of an issuer, for an investment management company, third party non-investor or issuer entity, or the like.

At 110, a set of data regarding a customer, prospective customer, insured, investor, etc., is input or invoked. In some embodiments, such data set comprises at least age, gender and a policy face amount. For example, the customer age may be 25, 35, 45 or 55, the customer gender male or female, and the face amount $100,000, $250,000, $500,000 or $1,000,000. In other embodiments, other data types may be included, such as a customer risk classification which may represent an underwriting risk class or alternatively a customer's or investor's investment risk tolerance. The investment risk tolerance, as with other data types, may be customer identified or may be selected by the issuer, investment management company, or other third party. For example, in some embodiments there are five investment risk classes in which a customer may be placed or self-associated. The classes may be entirely distinct or may comprise some common and some unique characteristics. For instance, with a five class arrangement, in an embodiment, the classes are ranked in accordance with a customer's investment risk tolerance which may be assessed as the customer's propensity to invest in equities versus fixed income products, such that risk class 1 assumes 72% fixed income investments and 28% equity investments, risk class 2 assumes 52% fixed income investments and 48% equity investments, risk class 3 assumes 37% fixed income investments and 63% equity investments, risk class 4 assumes 21% fixed income investments and 79% equity investments, and risk class 5 assumes 3% fixed income investments and 97% equity investments. In an example, it is assumed that irrespective of initial risk classification, during retirement years (e.g., from 65 years to 100 years of age), a customer will shift toward less volatile investments such as fixed income. Risk tolerance may be input as part of a questionnaire such as identified above designed to elicit information concerning a customer's or investor's risk tolerance, which the customer may or may not recognize as such but can be used in providing the objective recommendation or proposal of the present invention. The customer data set may include data regarding customer investment goals, specific life milestones, dates, other investments of the customer, income, debts, or any other variety of data which may be pertinent to selection or evaluation of investment options. In some embodiments, risk tolerance may also be identified based on other customer data provided and may be the result of a calculation performed by the system rather than input as a data item from the customer.

The data may be input through various means and in various forms. For example, the data may be obtained via the Internet, over the phone data entry system, or input into a computer system by an electronically readable form which has been filled out, or by an issuer or investment manager interviewing the customer in person or telephonically. Other methods of input are contemplated as within the scope of the invention. Notably, it is contemplated that the process is performed, in some embodiments, as part of a continuous management of a customer account, such as for the purpose of ensuring that the customer's investment portfolio continues to meet the customer's needs over time. In such a case, and in other embodiments, the customer data set may already be within the system, such as in the case of the process being performed as part of an annual or other time based review of the customer's portfolio, and thus the data is input by invoking the data from computer storage or a like facility. In some embodiments, preexisting data is invoked along with newly input data to provide a recommendation or proposal on an updated basis, such as in account or portfolio statements issued or made available to the customer.

For purposes of illustration, an example (Example X) customer data set may be:
Age: 45
Gender: Male
Face Amount: $500,000
Risk Class: 3 (63% equity; 37% fixed income)

At 120, at least two insurance products are selected for assessment. An insurance product in the present invention can comprise a wide variety of insurance products, or combination insurance with non-insurance investment products. For instance, the insurance product may be a variable universal life insurance policy, a term life insurance policy which may be with an additional non-insurance investment component, whole life insurance, etc. The insurance products may include a variety of options or modifications to a standard policy, may be wholly customized or the like. For instance, the insurance selection may include details concerning policy characteristics, such as, in the case of a term policy, the time during which the policy will be kept in effect. Any characteristics of insurance products in existence or later created could be included within the selection. In some embodiments, the selection of insurance products is based in part on the customer data set input or invoked, such as, in an example, the selection of insurance products based upon a customer risk classification or based upon the policy face amount. The selection may be undertaken in a variety of ways, such as from a preset list of available products, or may be input into a blank field. In some embodiments, as with the customer data set described above, predetermined criteria or information relating to the insurance product may already be stored in a system in which the process is performed. Such information may include, in some cases, an insurance product which a customer already possesses, to be evaluated against a different or newly available product. Alternatively, information concerning the insurance product could be input by the entity performing the process such as an issuer or investment manager, or in some embodiments, a combination of both predetermined and input criteria may be associated with the insurance product selected. Such criteria or information concerning the insurance product includes, in some embodiments, name of the product, policy numbers, product types, face amounts, cash flow, death or other benefit, cash surrender values, sub-account types, premium information, payments made, commuted value, interest rates, legal restrictions, guaranteed returns, premium and payment schedules, etc.

In our Example X, for illustration, selected insurance products comprise a variable universal life policy and a term policy where the difference in policy cost as compared with the variable universal life policy is invested.

At 130, an expected investment amount is calculated. In some embodiments, the expected investment amount is calculated by adjusting the nominal premium to be paid (e.g., the guideline annual premium, paid through age 65) by the mortality assumption consistent with an applicable underwriting scenario (e.g., multiplying the nominal premium every year from the beginning of the period through age 65 by the likelihood that the customer is still alive in that year). In some embodiments, the net present value of expected premium payments is then calculated to generate the expected investment. In some cases, multiple expected investment amounts are calculated based on different customer data sets for the same customer (e.g., with different assumptions for each data set, variation based on the type of insurance product, etc.). In another embodiment, which may vary based on insurance type selected, the expected investment amount is calculated by adjusting the premium to be paid by the mortality assumption for a specific underwriting scenario where the premium to be paid varies from time to time, such as one premium for years 1 to 10 and a different premium for years 11 to 20, or varies based on rating preferences.

Continuing with our Example X, for illustrative purposes, the investment amount for each of the insurance products is $11,801 per year for 20 years which, after adjusting for mortality and to present value, will equal $149,227 investment amount for each product.

At 140, an expected benefit from a first selected insurance product is calculated. In some embodiments, the determination of which insurance investment product is most suitable is based on factors such as the client's investment objective, risk tolerance, age, gender, underwriting class, tax bracket and varying dividend scale assumptions. In an embodiment, the expected benefit is calculated as the sum of the net present values of mortality weighted death benefits and mortality-weighted distributions or withdrawals and loans from the life insurance contract at appropriate points in time (in an embodiment, mortality weighting is completed in the same fashion as outlined above with respect to step 130). In some embodiments, the expected benefit is calculated as the sum of the net present values of the mortality weighted death benefit and mortality-weighted investment distributions, such as in the case of a term life insurance policy coupled with additional investments. In some cases, the amount divested in a given year is increased to reflect capital gains taxes due upon redemption, so that in any given year the amount of money being put into or received from the policy/portfolio after taxes (if applicable) will be equal between policy types. In an embodiment, investment return for a given market return scenario is calculated by adding in the additional contributions or subtracting redemptions and then multiplying the balance by a possible market return scenario and subtracting tax on dividends and capital gains. The remaining balance accrues in the portfolio and increases the balance of the investment account based on market returns each year through an age at which a given mortality table ends, such as age 100. At step 150, an expected benefit is calculated for a second type of insurance in manners similar to that described with respect to step 140 and may be adjusted based on the insurance type. It should be understood that more than two types of insurance may be selected for comparison and thus, in the case of FIG. 1, steps 140 or 150 would be repeated as necessary for the number of insurance products for which expected benefit calculation is required. In calculating expected benefits, a variety of data may be used including the face amount of the insurance policy, amount of death benefits payable upon the death of the insured, estimating the actuarial present value of the death benefits, dividends payable under the policy, the cash surrender value of the policy, the amount and characteristics of the accumulated assets, applicable tax rates. In some embodiments, the actuarial present value of the benefits is determined as the present value of the benefit adjusted for the mortality risk of the insured. Any suitable actuarial data may be used, for example, any suitable mortality rates or morbidity tables, and any suitable statistical data relating to mortality risk regarding the beneficiaries. In addition, the issuer may utilize any suitable statistical analysis, for example stochastic or Monte Carlo analyses, to estimate mortality rates, interest rates, future investment returns and any other factors affecting the expected benefits under the policy.

In some embodiments, estimating benefits includes estimating the current life expectancy of the insured, for which any suitable mortality rates and morbidity tables can be used. Examples of estimating life expectancies for insureds may be found in assignee's U.S. patent application Ser. No. 11/367,647. As further described there, for example, a stochastic cumulative survival rate $_tp'_x$ can be used. Exemplary formulas suitable for computing $_tp'_x$ are as follows:

$$p'_x = 1 - q'_x$$

$$_tp'_x = \prod_{t=0}^{t-1} p'_{x+t}$$

where, $q_x$—annual mortality rate for a person age x;

$p'_x$—annual stochastic survival rate for a person age x; and $_tp'_x$—cumulative survival rate, which is the probability that a person age x survives t years.

With reference to our Example X, and greatly simplified for ease of illustration, the expected benefits are assessed based on evaluation of policy year 1 and year 30 for each insurance investment product. The year 1 cash surrender value of the variable universal life policy is determined to be $9,967. The year 1 value of investments for the term/invest product is determined to be $11,685. In the example, the assumed fixed income and equity returns are 8% in all years. With respect to the term policy/invest product, the following calculations are made, in a simplified example:

| | |
|---|---|
| Year 1 Total Contribution: | $11,801.00 |
| Year 1 Term Premium: | $795.00 |
| Remaining Amount To Invest: | $11,006.00 |
| Amount deposited in to equity fund (63%): | $6,933.78 |
| Amount deposited in to fixed income fund (37%): | $4,072.33 |
| Results for equity fund: | |
| Amount deposited in to equity fund (63%): | $6,933.78 |
| Equity Dividend (2%): | $138.68 |
| Equity Capital Gain: (8% total yield less 2% dividend rate) | $416.04 |
| Sum: (8% total yield on equity component) | $554.70 |
| Tax on Dividend: (15% dividend tax rate * $138.68 dividend) | $20.80 |
| Tax on Equity Capital Gain: (15% cap gain tax rate * 80% rollover rate * $416.04) | $49.92 |
| Year End Equity Fund Amt: (6.98% rate of return) | $7,417.76 |
| Results for fixed income fund: | |
| Amount deposited in to fixed income fund (37%): | $4,072.33 |
| Income (8% return): | $325.79 |
| Capital Gain: (model set to yield 8% return in all year/scenarios, so no capital gain) | $0.00 |
| Tax on Income: (35% income tax rate * $325.79) | $114.02 |
| Year end fixed income fund gain: (5.20% rate of return) | $211.77 |
| Year end fixed income fund amt: | $4,284.10 |

-continued

| | |
|---|---|
| Results for combined investment: | |
| Year end equity fund amt: | $7,417.76 |
| Year end fixed income fund amt: | $4,284.10 |
| Total Amount in Funds: | $11,701.86 |
| Year 1 Investment Return: | $11,702/$11,006 − 1 = 6.32% |
| Year 1 Return on Total Investment (including term premium): | $11,702/$11,801 − 1 = −0.84% |

For variable universal life insurance, going into the thirtieth policy year, the cash surrender value is $442,000. During the thirtieth policy year there is no premium paid and the policyholder takes a disbursement of $34,999. Since by the seventh disbursement of $34,999 the amounts withdrawn exceed basis (20 premiums paid*$11,801=$236,020 while 7 disbursements*$34,999=$244,993), the disbursement is taken out of the policy as a policy loan and is not taxable. The amount of the disbursement, $34,999, is computed such that under the current economic scenario the policy will allow for level disbursements from 65 to 99 and the policy will have sufficient cash value to maintain the policy ($1 of CSV at age 100). The policy loan exceeds the cash value growth by only a nominal amount yielding a net reduction in the cash surrender value over the course of the year of less than $4,000, from $442,000 to $438,000.

With the term plus investment product, the combined fund value going into the thirtieth policy year is $354,000 (approximately $208,000 in the equity fund and $146,000 in the fixed income fund).

| Equity Fund Year 30 Performance: | |
|---|---|
| Year start amount in equity fund: | $207,944.00 |
|    Realized: $205,010 | |
|    Unrealized: $2,934 | |
| Amount withdrawn: | $16,119.78 |
| Equity dividend (2%): | $3,834.00 |
| Equity capital gain: | $11,503.00 |
| (8% total yield less 2% dividend rate) | |
| Sum: | $15,337.00 |
| (8% total yield on equity component) | |
| Tax on Dividend: | $575.00 |
| (15% dividend tax rate * $3,834 dividend) | |
| Tax on equity capital gain: | $1,732.44 |
| (15% cap gain tax rate * 80% * 11,503 + 15% cap gain tax rate * 80% * 2,934) | |
| Year end equity fund gain: | $13,029.56 |
| (6.79% rate of return) | |
| Fixed Income Fund | |
| Year start amount in fixed income fund: | $145,910.00 |
| Amount withdrawn: | $18,923.00 |
| Income: | $10,159.00 |
| (8% return) | |
| Capital Gain: | $0.00 |
| (model set to yield 8% return in all years and all scenarios, there is no capital gain) | |
| Tax on Income: | $3,556.00 |
| (35% income tax rate * $10,159) | |
| Year end fixed income fund gain: | $6,603.00 |
| (5.20% rate of return) | |

-continued

| Equity Fund Year 30 Performance: | |
|---|---|
| Year 30 start total fund value: | |
| Equity: | $207,944.00 |
| Fixed income: | $145,910.00 |
| Total: | $353,854.00 |
| Year 30 end total fund value: | |
| Starting balance and additions: | |
| Year start realized equity fund: | $205,010.00 |
| Year start unrealized equity fund value: | $2,934.00 |
| Equity dividend: | $3,834.00 |
| Equity capital gain: | $11,503.00 |
| Year start fixed income fund value | $145,910.00 |
| Fixed income income: | $10,159.00 |
| Deductions: | |
| Tax on dividend: | $575.00 |
| Tax on equity capital gain: | $1,732.00 |
| Fixed income tax on income | $3,556.00 |
| Disbursement: | $35,043.00 |
| Total: | $338,444.00 |

In our example, the variable universal life policy lost $4,000. in year thirty, which was less than 1% of its value in the thirtieth year. On the other hand, the term plus investment product lost 4.4% of its value, over $15,000, in the same policy year.

It should be recognized that the foregoing Example X is a simplified example intended to relay the primary components of a calculation in an embodiment of the invention. In other embodiments, the calculations become far more complex when all years are accounted for, different economic scenarios are introduced and assessed and multiple customer data sets are analyzed, the rebalancing of portfolios is introduced, etc.

Figure 5:
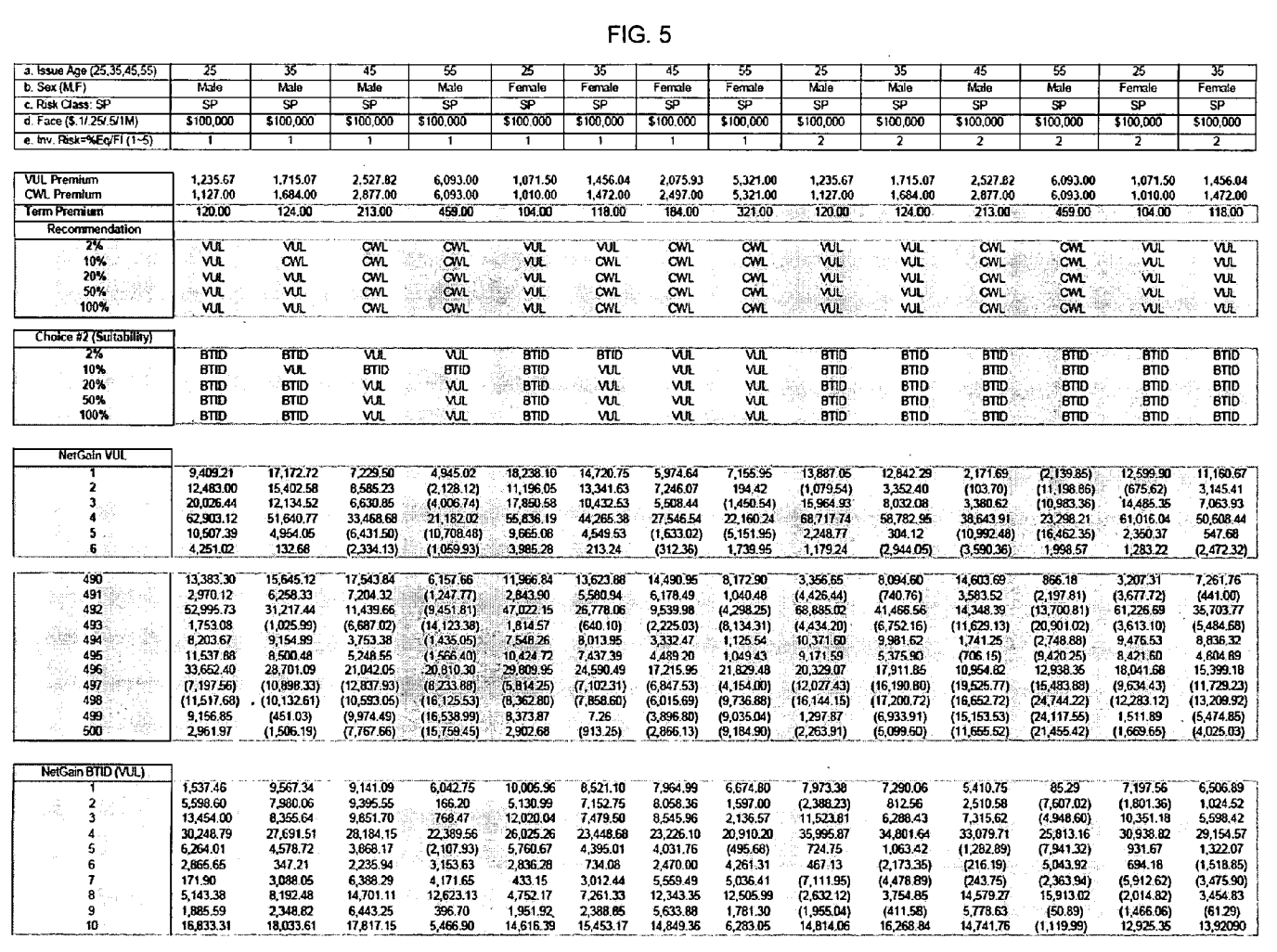

An example table of calculations in an embodiment is shown in FIG. 5. In FIG. 5, customer data sets are identified in the top cells (categories: issue age; sex; risk class; face amount; investor risk class). Various insurance investment products are identified with abbreviations VUL, CWL and BTID (which could be any chosen insurance products), along with premium amounts and net gains in five-hundred scenarios for each of the shown fourteen customer data sets and each insurance type. In the example of FIG. 5, the "Recommendation" at the 2% row results from taking five hundred net gain results and comparing the lowest 2% worst case scenarios and determining which product has a higher average value from those scenarios (e.g., compare the ten lowest values for VUL versus the ten lowest values for other insurance products). In this embodiment, the assumption is that a very conservative consumer most desires to minimize losses rather than achieve highest potential return. As one moves up in percentage (within the "Recommendation" box), the Recommendation is based on a greater portion of overall results with less security that the worse case scenario will be avoided. Thus, at the 2% level, the Recommendation is based on the result that 99% of the time the outcome will not be worse, whereas at the 10% level, the Recommendation is based on the result that 95% of the time the outcome will not be worse and so on. The "Choice #2" box reflects a second set of recommendations for consumers with income levels not high enough for a first set of insurance products.

FIG. 6 shows how one net gain result is calculated for a specific insurance product, e.g., variable universal life, in some embodiments. In an embodiment, the calculations are performed for numerous scenarios, such as five hundred, and the calculations illustrated by FIG. 6 are performed to obtain each net gain result.

At step 160, a value, which may be a net gain, for the insurance types is calculated based on the expected investment and benefit. In an embodiment, this is calculated as the net present value of benefits, or return, on the specific insurance type less the net present value of the investment for the specific insurance type.

Returning to our Example X, the net gain is shown as:

|  | Variable Life | Term Plus |
|---|---|---|
| PV of Investment | $149,227 | $149,227 |
| PV of Benefits | $238,098 | $200,718 |
| NET GAIN | $88,871 | $51,490 |

At step 170, a recommendation is provided for a specific insurance product based on a comparison of the values calculated in step 160 for each insurance type. In some embodiments, the recommended insurance product impacts upon additional investment considerations. For example, in an embodiment, if the model determines that term life insurance is the optimal product for a customer, then all other investments for such customer will be in mutual funds or exchange traded funds (ETFs). On the other hand, in another embodiment, if a custom whole life insurance product or variable universal life insurance product is the optimal solution, then the customer will meet his or her death benefit need with one of those products and will meet fixed income or equity needs with the cash value portion of such products. In some embodiments, the customer may meet some portion of fixed income or equity needs outside of the permanent insurance contract even when a permanent product is selected.

In our Example X, for illustration, the recommended insurance investment product is the variable universal life product, in view of the greater net gain for that product overall, given the particular factors and calculation results in the example.

In some embodiments, a recommendation is made based on highest expected return from among products compared. In other embodiments, a recommendation is made based on highest excess gain/standard deviation ratio. In still further embodiments, a recommendation is made based on highest expected return from among products compared, subject to a constraint that the excess gain/standard deviation ratio is in a range appropriate for a given investor's stated risk tolerance, where the excess gain/standard deviation ratios are grouped by investor age and the most conservative investors select a product with highest expected return subject to constraint that the ratio must be in the top 20% of ratios for that age group, the second most conservative investor chooses a product with highest net gain and a ratio in top 40% of ratios by age, etc.

In FIG. 7, an embodiment for providing insurance investment product recommendations is shown. In the example, at 710, consumer data variables are shown, such as age, sex, risk class, face value and investor risk level. In this embodiment, the recommendation model is run for multiple different tax brackets, a 28% tax bracket being shown, which impacts upon how much tax is paid on income received. At 720 expected returns are shown, including for an invest only comparison, that is, results for if an investor does not buy an insurance product to compare against the returns with the variety of insurance products. At 730 the standard deviations are shown. At 740, excess gain divided by standard deviation is shown, where excess gain indicates the excess over an investor's required return. At 750, the Recommendation shown as CWL (which could be any chosen insurance product), in this embodiment, indicates that CWL has the highest expected return values and a ratio of excess gain divided by standard deviation greater than the ratio required for person of that risk tolerance.

In the example, expected returns are compared and it is determined which results in the greatest return across 500 scenarios for each product. Then, the standard deviation from the 500 returns for each of the products is assessed. The expected gain is divided by the standard deviation for a return per unit of risk. The results are grouped for a given age (e.g., 25 years). It is then assumed that for the most conservative investor, they will want the highest expected gain but only to a certain level of deviation. At 760, the $20^{th}$ percentile of all expected returns is divided by standard deviation ratios for age set 25, that is, for all 25 year old ratios, what is the lowest 20%. Similar assessment is made for the lowest 40%, 60% and 80%. The insurance product returns are then assessed and if a particular insurance product has the highest expected return and an excess gain divided by standard deviation ratio greater than the ratio of 760, then that insurance product is recommended. If the excess gain divided by standard deviation ratio is less than the ratio of 760 then the system would look at results for another insurance product. In general, in the embodiment, the recommendation is based on the highest expected return but subject to the constraint that there cannot be too much risk for the expected return where the level of risk is determined by the risk level of the investor.

In some embodiments, the proposal generation system produces a recommendation as part of an application used by a customer to obtain the recommended insurance, including in some cases, pre-populated data fields in a user interface form based on the customer data sets and recommendation and blank fields for the customer to provide additional information required for the specific insurance product to be issued. Such insurance product application may be produced in a computer interface or in a paper medium. In other embodiments, the recommendation system provides an update to a customer's existing investment account, such as in the form of a report accessed through a website which informs the customer of his or her existing investments and indicates where and what changes are recommended, such as in a graphical display. The recommendation system in some embodiments provides sources for a customer to obtain the recommended insurance, such as through a list of issuers or links to issuer websites where applications may be obtained. In such a case, the application at the issuer, which may be a third party to the operator of the recommendation system, may be populated with customer data received as a result of the customer's linking to the third party website. In some embodiments, recommendations are provided as data or other files transmitted to a server or other data receipt device of a third-party issuer, investment management company or the like for use within such third-party's internal systems.

In some embodiments, where multiple sets of customer data is used, for each set of customer data (e.g., for each given age, gender and face amount), the process of generating investment returns is repeated (e.g., 500 times) using a stochastic economic scenario generator to simulate numerous different multi-year market return scenarios. Other modeling techniques (e.g., non-stochastic, multivariate including Monte Carlo, etc.) may be used without departure from the scope of the invention. This results in a multitude of different projections for net benefits for each of the different customer data sets which can be compared to provide a recommendation for the most appropriate insurance product for a particular customer.

Figure 2:
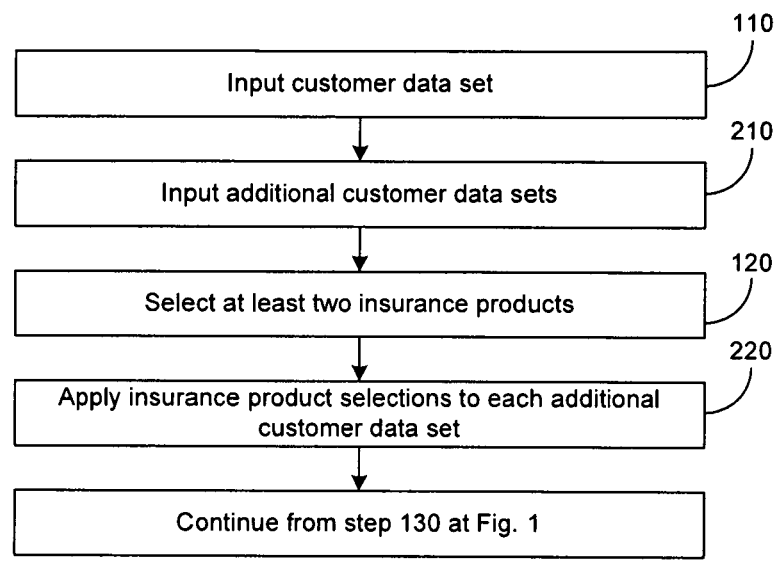
FIG. 2 illustrates a process of generating a recommendation for an insurance product, in accordance with another embodiment of the present invention.

Referring now to FIG. 2, a further example and details regarding one embodiment of the present invention are provided. At 110, as discussed above, a set of data regarding a customer, prospective customer, insured, investor, etc., is input or invoked. In the present example, at step 210, additional customer data sets are input, for the same customer. In other words, a recommendation for an insurance product for a given customer will include as a starting point multiple potential outcomes for the same customer. Thus, in an embodiment, the customer is assumed to buy a 20 year term policy and four distinct possibilities are considered for how the policy may turn out. For instance, (1) after 20-year term period expires, the customer no longer qualifies for insurance at any rates; (2) after 20-year term period expires, customer re-qualifies (and continues to re-qualify) as th underwriting class at which she initially qualified; (3) after 20-year term period expires, policyholder re-qualifies (and continues to re-qualify) at a less preferential underwriting class than the one at which she initially qualified; and (4) term premiums are charged based on an expectation of mortality (a hypothetical construction which ignores any need to renew in different status classes etc.). For the last category, in an embodiment, the premiums upon policy renewal are computed based on actuarial tables to estimate the amount based on the initial underwriting, but assuming no new underwriting. It should be noted that there may be overlap among the customer data sets and the insurance type criteria. For instance, insurance products may have certain underwriting criteria which will require, relate to or comprise customer data of a particular type. Thus, both the customer data set and the insurance type information will call for a common data item.

Still with respect to FIG. 2, at step 120, an insurance product is selected, as discussed above. In step 220, the insurance product selection is applied to each additional customer data set. Thus, in the present example, the selected insurance would be applied to each of the four outcome scenarios previously described. The process of FIG. 2 then continues with step 130 and subsequent steps of FIG. 1. Thus, in some embodiments, each of the subsequent steps from 130 on will be conducted with respect to each of the four customer data sets. It should be understood that any number of customer data sets and outcome variations may be used without departing from the scope of the invention.

Figure 3:
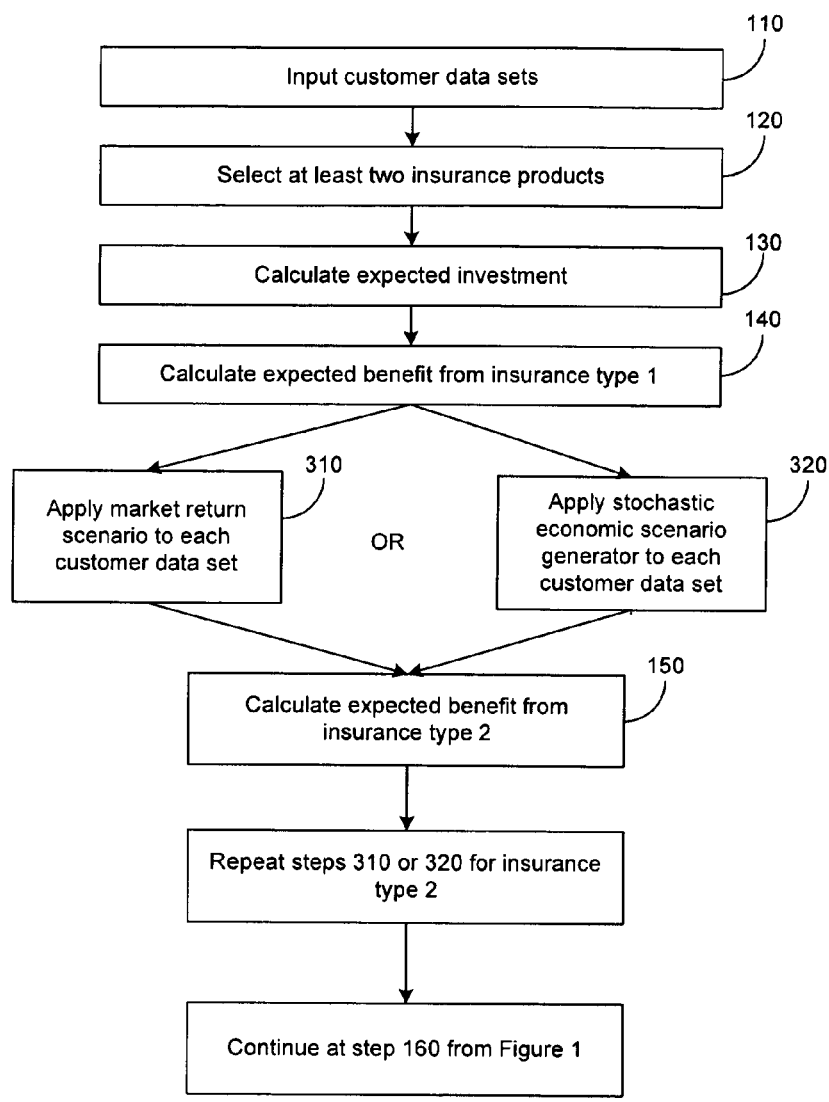
FIG. 3 illustrates a process of generating a recommendation for an insurance product, in accordance with another embodiment of the present invention.

Turning now to FIG. 3, another embodiment of the invention is disclosed. The steps 110 to 130 are carried out as was described above with reference to FIGS. 1 and 2. In one embodiment, in step 140, an expected benefit is calculated with respect to the first type of insurance product. At this point, at step 310 the calculation of the expected benefit includes the application of a market return scenario to the customer data set and insurance type. Alternatively, at step 320, a stochastic economic scenario generator may be applied to each set of customer data and insurance type. Although a market return scenario and stochastic economic scenario generator are used in the example embodiment, modified versions of these or other scenario generators or models may be applied consistent with the scope of the invention, as discussed above. In an embodiment, the stochastic economic scenario generator is applied to all of the sets of customer data such as the four discussed with reference to FIG. 2. In some embodiments, numerous scenarios are generated (e.g., several hundred) for a broad spectrum of outcome possibilities.

Referring still to FIG. 3, at step 150, the expected benefit from the second type of insurance product is calculated repeating, in this embodiment, steps 310 or 320, as described, with respect to the second type of insurance. Next, the process continues at step 160 from FIG. 1 as previously described.

Figure 4:
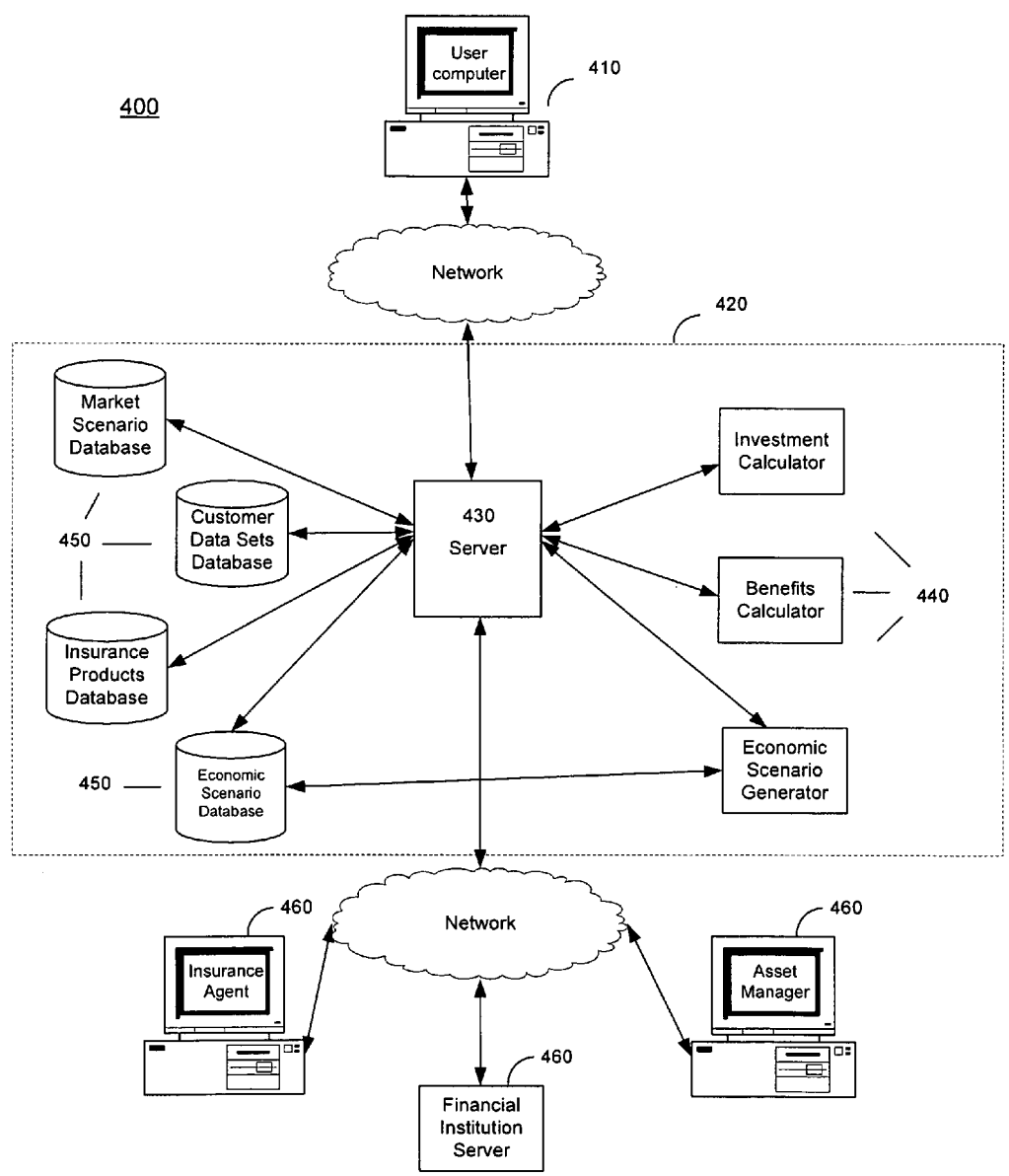
FIG. 4 illustrates a system for generating recommendations for an insurance products, in accordance with another embodiment of the present invention.

Turning to FIG. 4, there is shown an embodiment of a system 400 for providing an objectively appropriate insurance investment product for a customer. System 400 is an example system suitable in implementing processes 100, 200 and 300 and other embodiments described herein.

System 400 includes a user computer 410. User computer 410 includes a user interface for inputting or invoking customer data sets and insurance type selections, such as in steps 110 and 120 described herein. User computer 410 is connected via a network to a processing station 420. In some embodiments, user computer may be a terminal operated by an insurance agent, investment manager, or a customer for an insurance product. In some embodiments, user computer 410 may be used, for example, to invoke an existing customer data set, such as for a customer who has already purchased a type of insurance investment product. In other embodiments, user computer may be used to input, either through an electronic form, scanner, keyboard or any other suitable input mechanism, customer data sets for prospective customers. In some embodiments, customer data sets may be hypothetical, used for the purpose of providing recommendations to a class of persons meeting certain criteria or falling within certain categories or classes (e.g., for broad class recommendations to groups of persons such as AARP members). Alternatively, or in addition, user computer may be used by a customer or prospective customer using the user interface to input his or her own customer data sets and insurance selections to obtain a recommendation from the system without an intermediary. User computer may, in some embodiments, be within an investment management company or insurance company and may be enabled to input customer data and insurance selections for recommendations for their own or a third party investment product. In some embodiments, an alternate input device may be used, such as a server which is connected to data stores holding customer data sets and insurance product types and connects directly to processing station 420 without human involvement in the input of customer data and insurance product types.

Processing station 420 receives the customer data sets and insurance type selections from user computer 410 (or alternative input mechanism such as a server) and includes one or more servers 430 to receive the input, one or more processors, calculators or generators 440 connected, physically or through any network arrangement, to the servers 430, and one or more databases 450 storing customer data sets, insurance product types, market scenario data (which may comprise any data used for modeling and calculating expected benefits or returns from insurance product types.)

Processors 440 are used for calculating expected investments and benefits. In alternative embodiments, user computer may calculate expected investments and provide such calculations to processing station for further analysis. Processors are also used in some embodiments to calculate expected benefits using, for example, a stochastic economic scenario generator, as previously described.

Databases such as 450 contain any number and type of data, as previously described with reference to customer data sets and insurance types.

With continued reference to the system of FIG. 4, 460 comprises various computers enabled to receive and produce recommendations for insurance products.

While the invention has been described and illustrated in connection with preferred embodiments, many variations and modifications as are to be evident to those of skill in the art may be made without departing from the spirit and scope of the invention, and the invention is thus not to be limited to the precise details of methodology or construction set forth above, as such variations and modifications are intended to be included within the scope of the invention. It is to be understood by those of ordinary skill in the art that the various data processing tasks described herein may be implemented in a wide variety of ways, many of which are known and many more of which are doubtless to be hereafter developed. For example, a wide variety of computer programs and languages are now known, and are likely to be developed, which are suitable for storing, accessing, and processing data, as well as for performing, processing, and using actuarial forecasts and other analyses as disclosed herein.

What is claimed is:

1. A computerized method for linking a user device to websites based on a determination of objectively appropriate insurance investment products for a customer, the method comprising:

electronically receiving a set of customer data by a processing device invoking the set of customer data from one or more databases over a communications network, the set of customer data including at least age, gender, policy face amount and an investment risk tolerance which indicates propensity of the customer to invest in equities versus fixed income products;

selecting, via the processing device, at least two insurance products for comparison based on the set of customer data;

calculating, by the processing device, an expected investment in each of the selected insurance products, the expected investment including a sum of premiums to be paid for a given duration multiplied by a mortality factor;

calculating, by the processing device, an expected benefit from a first insurance product and from a second insurance product, each of the expected benefits including a sum of a net present value of an insurance benefit and investment return multiplied by the mortality factor, the investment return calculated using at least an economic model, wherein the economic model comprises a stochastic economic scenario generator that simulates multiple different market return scenarios for the set of customer data;

calculating, by the processing device, a value for each of the first and the second insurance products based on the expected investment and respective expected benefit; and generating, via the processing device, recommendation data for an insurance product, the recommendation generated based at least in part on a comparison of the value for the first insurance product and the value of the second insurance product, a comparison of results from the economic scenario generator for the set of customer data, and a highest expected return from among the first and second insurance products compared subject to a determination that a ratio of an excess gain divided by standard deviation is in a specified range based on the investment risk tolerance, the excess gain including gains in the investment returns in excess of a required return specified by the customer;

selecting, via the processing device, one of the first insurance product and the second insurance product based on the recommendation data; and providing, via the processing device, links configured to direct a user device of the customer to websites based on the recommendation data, the websites including electronic application data for the selected one of the first insurance product and the second insurance product.

2. The method of claim 1, comprising receiving more than one set of customer data.

3. The method of claim 1, wherein the investment risk tolerance is specified by the customer.

4. The method of claim 1, wherein the selection of insurance product types is based at least in part on the investment risk tolerance assigned to the customer.

5. The method of claim 1, wherein the two insurance products are variations of a single type of insurance product.

6. The method of claim 1, comprising selecting a variable universal life insurance product.

7. The method of claim 1, comprising selecting a term life insurance product.

8. The method of claim 1, wherein calculating an expected investment in the selected insurance product comprises calculating expected premiums to be paid based at least in part on a mortality assumption corresponding to the set of customer data.

9. The method of claim 1, wherein calculating an expected investment in the selected insurance product comprises calculating expected premiums to be paid based at least in part on characteristics of the selected insurance product.

10. The method of claim 1, wherein calculating an expected benefit from a first type of insurance product or a second type of insurance product comprises calculating an expected benefit based at least in part on mortality weighted death benefits and mortality weighted distributions.

11. The method of claim 1, wherein calculating an expected benefit from a first type of insurance product or a second type of insurance product comprises calculating an expected benefit based at least in part on a market return scenario.

12. The method of claim 1, wherein calculating an expected benefit from a first type of insurance product or a second type of insurance product comprises calculating an expected benefit based at least in part on mortality weighted death benefits, mortality weighted withdrawals and loans from the policy to generate income after age 65, gradually reducing a value of a given insurance product until the policy is fully consumed at age 100.

13. A system for linking a user device to websites based on a determination of objectively appropriate insurance investment products for a customer, the system comprising:

a computer effective to receive one or more sets of customer data by invoking the one or more sets of customer data from one or more databases, the one or more sets of customer data including for each customer at least age, gender, policy face amount and an investment risk tolerance which indicates propensity of the customer to invest in equities versus fixed income products; the one or more databases for storing the customer data set, insurance product data and economic data; the computer including a processor, the processor configured to: calculate an expected investment in each of two insurance products selected for comparison based on the set of customer data wherein the expected investment includes a sum of premiums to be paid for a given duration multiplied by a mortality factor, an expected benefit from each of the first insurance product and the second insurance product where each of the expected benefits includes a sum of a net present value of an insurance benefit and investment return multiplied by the mortality factor and where the investment return is calculated using at least an economic model, and a value for each of the first and the second insurance products based on the expected investment and respective expected benefit, wherein the economic model comprises a stochastic economic scenario generator that simulates multiple different market return scenarios for the set of customer data; generate a recommendation for an insurance product based at least in part on a comparison of the value for the first insurance product and the value of the second insurance product, a comparison of results from the economic scenario generator for the set of customer data, and a highest expected return from among the first and second insurance products compared subject to a determination that a ratio of an excess gain divided by standard deviation is in a specified range based on the investment risk tolerance, the excess gain including gains in the investment returns in excess of a required return specified by the customer; select one of the first insurance product and the second insurance product based on the recommendation data; and provide links configured to direct a user device of the customer to websites based on the recommendation data, the websites including electronic application data for the selected one of the first insurance product and the second insurance product.

14. The method of claim 1, comprising presenting a ranked set of risk classes, each of the risk classes representing a predefined ratio of equity and fixed income investments, wherein the investment risk tolerance is input as a selection of one of the risk classes.

15. The method of claim 14, wherein the expected investment for each of the insurance products is calculated assuming an allocation of an investable amount of customer contributions between equity and fixed income investments in proportion to the predefined ratio of the selected investment risk class and wherein the value for each of the first and second insurance product is a sum of a net present value of the expected investment and a net present value of the expected benefit.

16. A computerized method for linking a user device to websites based on a determination of objectively appropriate insurance investment product for a customer, the method comprising:

receiving as input in electronic form by a processing device invoking a set of customer data from one or more databases over a communications network, the set of customer data including at least age, gender, a policy face amount and a selection of an investment risk tolerance class of a plurality of ranked investment risk tolerance classes, wherein each of the investment risk tolerance classes indicate a relative propensity for the customer to invest in equities versus fixed income products, and wherein each of the investment risk tolerance classes represents a predefined ratio of equity to fixed income investments, selecting, via the processing device, at least two insurance products for comparison based on the set of customer data, wherein at least a first of the at least two insurance products is a variable universal life product and at least one a second of the at least two insurance products is a term life insurance product;

calculating, by the processing device, an expected investment in each of the selected insurance products, the expected investment including a sum of premiums to be paid for a given duration multiplied by a mortality factor and wherein the expected investment for each of the insurance products is calculated assuming an allocation of an investable amount of customer contributions between equity and fixed income investments in proportion to the predefined ratio of the selected investment risk tolerance class;

calculating, by the processing device, an expected benefit from the first insurance product and from the second insurance product each of the expected benefits including a sum of a net present value of an insurance benefit and investment return multiplied by the mortality factor, the investment return calculated using at least an economic model, wherein the economic model comprises a stochastic economic scenario generator that simulates multiple different market return scenarios for the set of customer data;

calculating, by the processing device, a value for each of the first and the second insurance products based on the expected investment and respective expected benefit, wherein the value for each of the first and second insurance product is a sum of a net present value of the expected investment and a net present value of the expected benefit; and generating, via the processing device, recommendation data for an insurance product, the recommendation generated based at least in part on a comparison of the value for the first insurance product and the value of the second insurance product, a comparison of results from the economic scenario generator for the set of customer data, and a highest expected return from among the first and second insurance products compared subject to a determination that a ratio of an excess gain divided by standard deviation is in a specified range based on the selected investment risk tolerance class, the excess gain including gains in the investment returns in excess of a required return specified by the customer;

selecting, via the processing device, one of the first insurance product and the second insurance product based on the recommendation data; and providing, via the processing device, links configured to direct a user device of the customer to websites based on the recommendation data, the websites including electronic application data for the selected one of the first insurance product and the second insurance product.

17. The method of claim 16, wherein the expected benefit is calculated based at least in part on mortality weighted death benefits, mortality weighted withdrawals and loans from the policy to generate income after age 65, while gradually reducing a value of a given insurance product until the policy is fully consumed at age 100.

* * * * *